April 6, 1965
E. C. MERSEREAU
3,176,539
HAND BRAKE MECHANISM
Filed Aug. 28, 1962
2 Sheets-Sheet 1
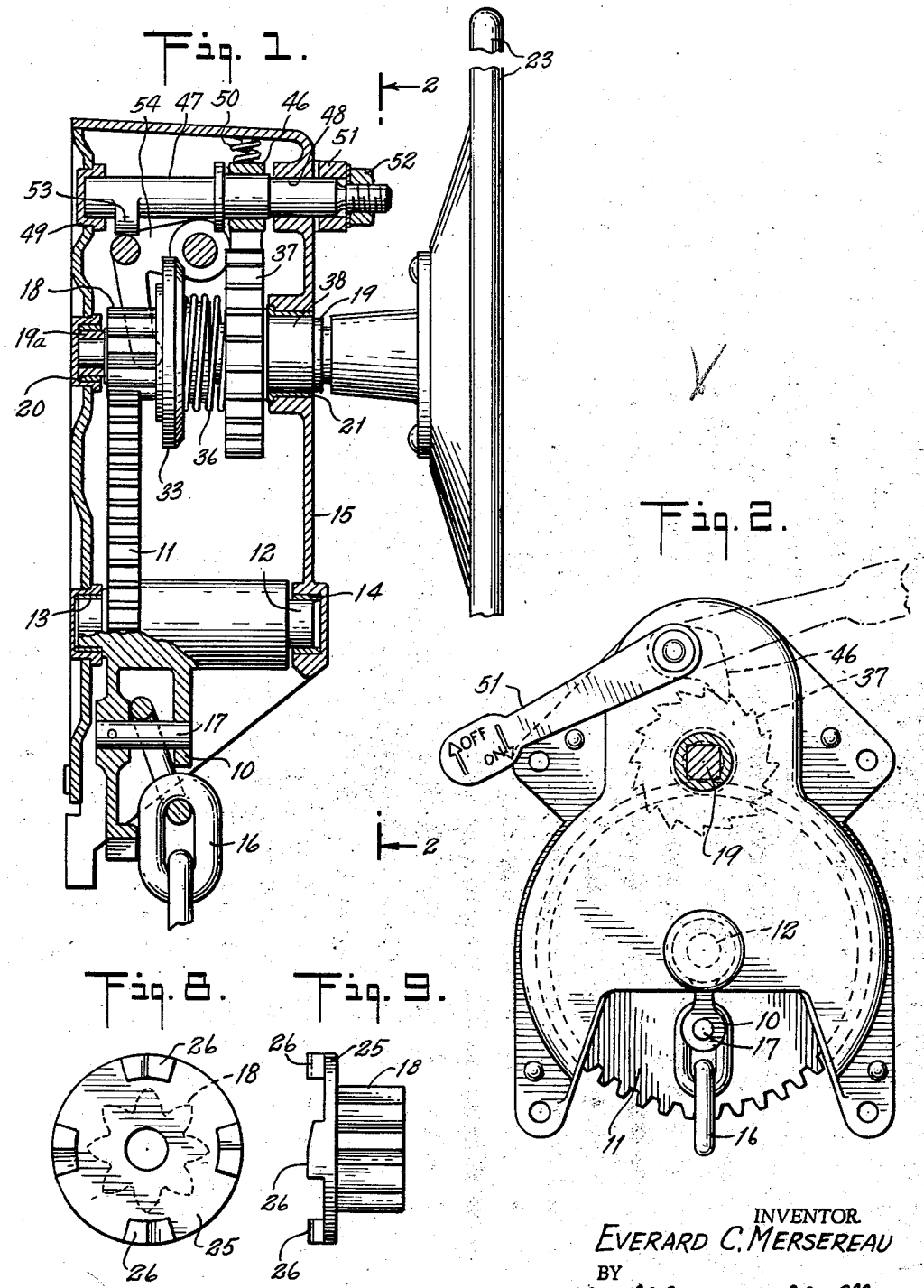
INVENTOR.
EVERARD C. MERSEREAU
BY
Ward, Neal, Haselton, Orne & McElhannon
ATTORNEYS April 6, 1965 E. C. MERSEREAU 3,176,539
HAND BRAKE MECHANISM
Filed Aug. 28, 1962 2 Sheets-Sheet 2
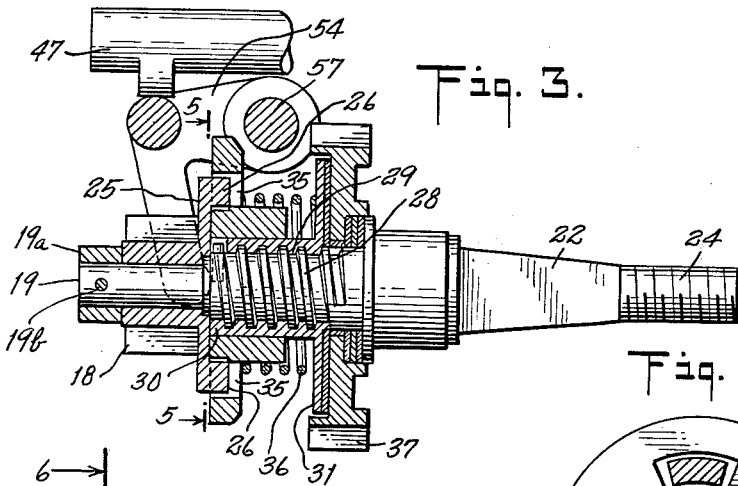
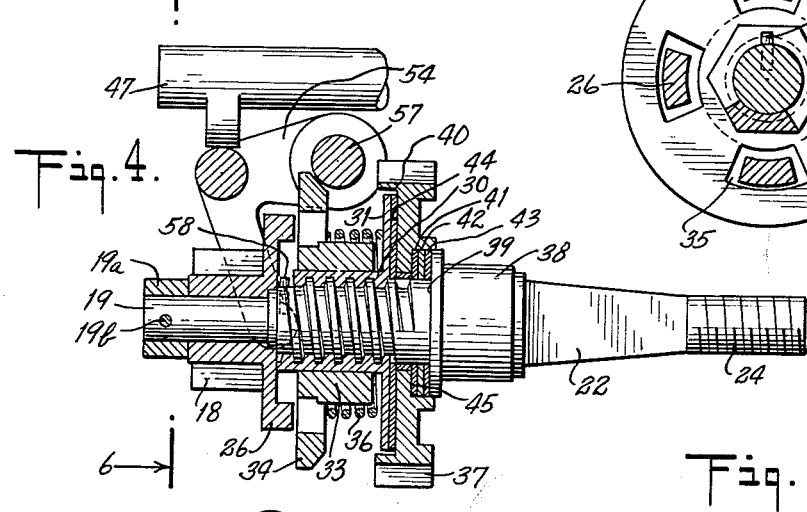
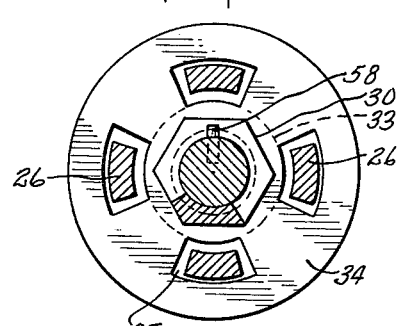
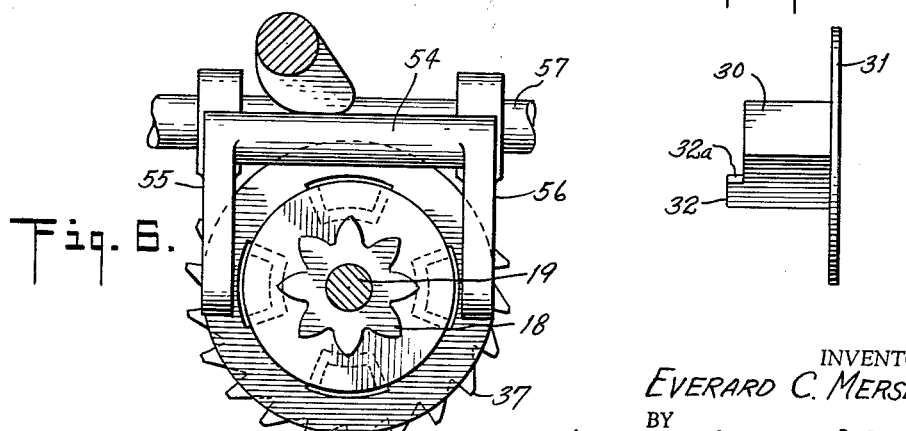
INVENTOR.
EVERARD C. MERSEREAU
BY
ATTORNEYS

United States Patent Office 3,176,539
Patented Apr. 6, 1965

3,176,539
HAND BRAKE MECHANISM
Everard C. Mersereau, Westfield, N.J., assignor to Ellcon-National, Inc., New York, N. Y., a corporation of New York
Filed Aug. 28, 1962, Ser. No. 219,834
5 Claims. (Cl. 74—505)

This invention relates to brake mechanisms and more particularly to hand brake mechanisms for railway cars employing both a friction clutch and a breakaway clutch.

Heretofore, railway car hand brakes have been made in two general categories both of which are activated by rotation of a large rotatable hand wheel vertically disposed on a shaft and embodying a suitable gear train by which the torque applied to the hand wheel is utilized to engage or release the brakes. The force produced by turning the hand wheel in a clockwise direction to engage the brakes is held by means of a detent wheel mounted on the hand wheel shaft and a pawl pivotally mounted in the retaining housing.

Hand brakes in the first category were so designed that by manipulating a trip lever, the pawl is raised from engagement with the detent wheel thus releasing the force and permitting the gear train to revolve in the opposite direction to release the brake. With hand brakes in this category, the hand wheel spins violently in a counter-clockwise direction during release of the brakes, thus endangering the operator if he did not get his hands from the wheel in time, or if he caught his clothes in the wheel.

Hand brakes in the second or friction clutch category are of generally the same construction as outlined above, one form thereof being set forth in my Patent No. 2,618,169, but the trip lever is eliminated and in its place a friction clutch is employed. The clutch is engaged and disengaged by the axial movement of an internally threaded pinion gear mounted on the shaft. Clockwise movement of the hand wheel moves the pinion gear to engage the clutch with the detent wheel and the detent wheel is held in place by a pawl. Counterclockwise movement of the hand wheel releases the brakes, but to fully release them it is necessary to move the hand wheel a substantial amount counterclockwise, e.g. several turns. An advantage of the clutch type of hand brake is that the brakes could be adjusted to any desired position by counterclockwise movement of the hand wheel. When the movement stopped the pinion would again engage the clutch. However, complete release of the brakes requires time and is extremely inconvenient when it is necessary to completely release all the brakes on a number of cars in a long train. The problem is especially acute when it is necessary to meet the exacting time schedules in large railroad yards.

Brakes in the first category then are disadvantageous because of possible danger to the operator. Brakes in the second category are disadvantageous because of the time involved in their complete release.

Accordingly, it is an object of this invention to provide a brake mechanism which substantially overcomes the above enumerated disadvantages.

It is a more specific object of this invention to provide a brake mechanism which can be released quickly without danger to the operator and which can, if desired, be released more slowly or in small increments.

In accordance with this invention, a brake mechanism is provided which can be released in either of two manners: (1) by manipulating a trip lever but with the hand wheel remaining stationary; and (2) by rotation of the hand wheel.

The invention may be better understood by referring to the following detailed description and to the accompanying drawings in which:

FIG. 1 is a side elevation view, partly in section, of a brake mechanism incorporating the invention;

FIG. 2 is a front view, partly in section, of the brake mechanism of FIG. 1, and is taken along the lines 2—2 of FIG. 1;

FIG. 3 is a fragmentary, sectional, side elevation view showing certain component parts of the brake mechanism of FIG. 1 in the positions assumed during application of the brakes of the vehicle on which the mechanism is mounted;

FIG. 4 is a view similar to FIG. 3 showing the positions assumed by the component parts after quick release of the brakes on the vehicle on which the mechanism is mounted;

FIG. 5 is a cross-sectional view of a portion of the mechanism shown in FIGS. 1–4 and is taken along the lines 5—5 of FIG. 3;

FIG. 6 is a fragmentary, rear elevation of the brake mechanism taken along the lines 6—6 of FIG. 4;

FIG. 7 is a side elevation view of one element of the clutch mechanism shown in the preceeding figures; and FIGS. 8 and 9 are, respectively, front and side elevation views of another element of the clutch mechanism shown in the preceding figures.

Referring to FIG. 1, the brake operating mechanism comprises a drum 10 rotatable by a gear 11 which may be rigidly connected to the drum 10. The drum 10 and gear 11 are mounted on a shaft 12 which may be journalled at its ends in bearings 13 and 14 mounted on the housing 15. The drum 10 operates the brake rigging on the vehicle on which it is mounted and may be connected therewith by a chain 16 which is fastened to the drum 10 by a pin 17.

The gear 11 is rotatable by pinion gear 18 which is mounted on shaft 19 and freely rotatable thereon. Shaft 19 is supported by bearings 20 and 21 mounted on housing 15. The shaft 19 may have a tapered portion 22 (FIG. 3) which carries a manually operated member such as hand wheel 23 for manually rotating shaft 19. Shaft 19 also has a threaded portion 24 for cooperative engagement with a nut (not shown) which holds hand wheel 23 on shaft 19.

Pinion gear 18 is illustrated by itself in FIGS. 8 and 9, and has a flange substantially perpendicular to the axis of the shaft 19 and at one side thereof. The flange 25 is formed with a plurality of peripherally spaced axially extending teeth 26 for a purpose to be described later. The rear surface 27 of pinion gear 18 bears against a collar 19a secured to the shaft 19 by a pin 19b. Although gear 18 is rotatable about the shaft 19, it cannot move axially thereof to any significant extent.

As illustrated in FIGS. 3 and 4, there is a threaded portion 28 on the shaft 19 which in cooperation with a threaded portion 29 of the driving or clutch member 30 moves the driving member 30 axially of the shaft 19 upon relative rotational movement of the shaft 19 and the driving member 30. The threads of the portion 28 act as a cam having helical surfaces which engage the helical surfaces of the threaded portion 29 on the driving member 30. The outside surface of the driving member 30 is non-circular in cross-section, and preferably is hexagonal in contour, as shown in FIG. 5, although other shapes may be employed. On the side of member 30 facing the hand wheel 23, there is a flange 31 substantially perpendicular to the axis of the shaft 19 and of larger outside diameter than the driving member body. On the side of member 30 opposite flange 31 is a projection 32 (FIG. 7) for a purpose to be explained later.

A coupling member 33 with a bore which will receive the non-circular surface of the member 30, such as a hexagonal bore, is slidably mounted on driving member 30. The member 33 has a flange 34 on one side, the same being formed with a plurality of peripherally spaced, axially extending apertures 35 for cooperative engagement with the teeth 26 of pinion gear 18.

Between flanges 34 and 31 and on the rearward side of each is a spring 36 which normally urges coupling member 33 toward the pinion gear 18 so that the teeth 26 enter the apertures 35.

The shaft 19 has an enlarged portion 38 having a face 39 substantially perpendicular to the axis of the shaft 19. The face 39 is part of a clutch, and the portion 38 is preferably formed integrally with the shaft 19, but may be pressed on the shaft or otherwise fastened thereto so as to be rotatable therewith.

A plurality of clutch discs 40, 41, 42 and 43 are mounted on the shaft 19, disc 40 being between one surface 44 of a detent wheel 37 rotatably mounted on the shaft 19 and the flange 31 of the driving member 30 and the other discs 41–43 being between the other surface 45 of the detent wheel 37 and the face 39 of the enlarged portion 38. When the shaft 19 is rotated in a clockwise direction as viewed from the right in FIG. 1, the driving member 30 moves axially to the right clamping the clutch discs 40–43 and the detent wheel 37 between the face 39 of the enlarged portion 38 and the face of the flange 31 of the driving member 30. When sufficient pressure has been applied to the clutch discs and the detent wheel 37, the friction between the clutch discs, the surface 45 and the face 39 and between the flange 31 and the surface 44 is such that the detent wheel 37 rotates with the shaft 19.

The detent wheel 37 cooperates with a pawl 46 (FIGS. 1 and 2) pivotally supported on a shaft 47 supported by a journal 48 and a bearing cup 49 in housing 15. The pawl 46 is pressed into engagement with the teeth on the periphery of the detent wheel 37 by a spring 50. Thus, when the brakes of a vehicle on which the brake mechanism may be mounted are operated by the mechanism, the shaft 19 and the brakes are held in the applied position by the cooperation of the detent wheel 37, the pawl 46 and the clutch mechanism until the hand wheel 23 is rotated in a counterclockwise direction. The pawl 46 however is always held in positive engagement with the detent wheel 37. Such clutch mechanism and its operation are described in my Patent No. 2,618,169.

A trip lever 51 is mounted on the end of the shaft 47 facing the hand wheel 23 and is held thereon, such as by a key, so that the shaft 47 is rotatable by the movement of the lever 51. A nut 52 threadedly engages the extreme end of the shaft and aids in securing the trip lever 51 to the shaft 47. Rotation of the shaft 47 does not disengage the pawl 46 from the teeth of the detent wheel 37.

Intermediate the pawl 46 and the bearing cup 49 is a manipulating cam 53 which engages a bell crank 54 with downwardly turned fingers 55 and 56. The bell crank 54 is pivotally mounted on a shaft 57 which is perpendicular to the axis of shaft 47 and is mounted on housing 15. The fingers 55 and 56 engage the flange 34 of the coupling member 33. Thus, rotation of the manipulating cam 53 to the downward position, as viewed in FIG. 6, forces the bell crank 54 down so that the fingers 55 and 56 force coupling member 33 out of engagement with the teeth 26 on the pinion gear 18.

In the embodiment shown, there is a pin 58 in the shaft 19 and positioned between the pinion gear 18 and the driving member 30, which pin 58 engages projection 32 on the driving member 30. The pin 58 and the projection 32 function as stop members, as will be explained more fully hereinafter.

The operation of the brake mechanism embodying this invention as illustrated in the drawings will now be explained in detail. Assuming that the brakes on the vehicle to which the mechanism is attached are released and that, manipulating cam 53 is in the up position, coupling member 33 is biased toward the pinion gear 18 by the action of the spring 36, the teeth 26 on pinion gear 18 projecting into apertures 35 of coupling member 33. If driving member 30 is positioned so that it does not drive detent wheel 37, movement of hand wheel 23 in a clockwise direction will cause driving member 30 to move axially to the right because of the threaded portions 28 and 29 and because of the counterforce exerted by gear 11 acting through pinion gear 18 on coupling member 33. Coupling member 33, however, will remain engaged with pinion gear 18 because of the biasing force of spring 36 and because coupling member 35 is slidably mounted on although rotatable with the driving member 30. Continued clockwise movement of hand wheel 23 will cause driving member 30 to move further to the right until the clutch discs 40–43 engage the detent wheel 37 causing it to rotate with shaft 19. At this point, continued application of force in a clockwise direction on hand wheel 23 will cause gear 11 to rotate so as to apply the brakes. When the desired amount of force has been applied, pawl 46 which always remains in positive engagement with detent wheel 37 will prevent release of the brakes.

To release the brakes by the operation of hand wheel 23, the latter is turned in a counterclockwise direction as viewed from the right in FIG. 1. The action of pawl 46 prevents detent wheel 37 and, hence, initially the driving member 30, from rotating with the shaft 19, and therefore, due to the threaded portion 28 and 29 the driving member 30 tends to move axially to the left, reducing the friction between the flange 31 and the disc 40. When the friction is sufficiently reduced, the force applied to the member 30 by the brake rigging through the gears 11 and 18 and coupling member 33 causes the member 30 to rotate in the same direction as the shaft 19, and with respect to the stationary detent wheel 37. As long as the operator continues to rotate the hand wheel 23 in the counterclockwise direction, the brakes will continue to be released, but when rotation of the hand wheel 23 is discontinued the member 30 can rotate only the small amount necessary to cause the clutch mechanism to be effective again, and the brakes will remain applied to the extent determined by the previous counterclockwise rotation of the wheel 23. Therefore, in order to fully release the brakes, the hand wheel must be rotated several times.

For reasons well known to those skilled in the art, the foregoing mechanism for gradual and partial release of the brakes of a vehicle, such as a railway car, without hazardous spinning of the hand wheel 23 are desirable under many circumstances, and are sufficient when the brakes of only one or a few vehicles are to be released, or when there is no urgency in releasing the brakes. However, when the brakes of several vehicles are to be released, or when it is desired to release the brakes of one or more cars quickly, the foregoing mechanisms alone are not completely satisfactory and are time consuming. The latter factor is particularly important under the present practice of attempting to speed up freight operations and to use very long trains of freight cars.

With the brake mechanism of the present invention, the above-described desirable mechanisms are available with their accompanying functions as well as a quick, complete brake release operation with the addition of relatively few parts and without spinning of the hand wheel 23 during release of the brakes. The brakes may be so released by movement of the trip lever 51, without operating the hand wheel 23, to the position in which the manipulating cam 53 forces bell crank 54 downwardly. This forces the fingers 55 and 56 against the flange 34 of coupling member 33 and disengages the coupling member 33 from the teeth 26 on the pinion gear 18, so that the member 33 is in the position shown in FIG. 4. In such position of member 33 the detent wheel 37 and pawl 46 are no longer operative to prevent rotation of the pinion gear 18, and since the latter is freely rotatable about shaft 19, the brakes will be quickly and fully released without rotation of the hand wheel 23. Opposite movement of trip lever 51 releases coupling member 33 and the force of the spring 36 moves the member 33 back into engagement with pinion gear 18 so that the brake mechanism is again operative for applying the brakes as described above.

If, when the hand wheel 23 is turned in the counterclockwise direction, the gear 11 is not rotated by the pull of the brake rigging, it may be necessary to rotate the hand wheel 23 in an amount sufficient to cause the pinion 18 to drive the gear 11 in a direction opposite to the direction in which it was turned when the brakes were applied. In the absence of the projecting pin 58 and when the hand wheel 23 is so rotated, the driving member 30 would be forced against the face of the pinion 18 jamming the member 30 against the pinion 18. Similarly, if the brakes were fully released and the hand wheel 23 were turned in the counterclockwise direction, the driving member 30 would also become jammed against the pinion 18. Such jamming would make it difficult to release the driving member 30 from the pinion 18 and to return the driving member 30 to the clutch engaging position. Such jamming would cause increased difficulty if the jamming continued for a period of time sufficient for rust to form between the abutting end faces of the member 30 and pinion 18. However, with such a connection between the pinion 18 and the member 30, there is a binding or jamming effect which makes it difficult to separate the pinion 18 and the member 30 when the brakes are subsequently applied, particularly if they remain in contact for a period of time sufficient for rust to form between them. Such jamming may, in fact, prevent operation of the clutch mechanism during subsequent application of the brakes by rotation of the hand wheel 23.

In the preferred embodiment of the invention, the pin 58, extending from the shaft 19, is provided and is engageable with the projection 32 on the member 30 at the axially extending face 32a (FIG. 7) thereof when there is relative rotation of the shaft 19 and the member 30 of only part of one revolution. Preferably, the pin 58 engages the face 32a before the member 30 moves a sufficient distance axially of the shaft 19 to engage the end of the pinion 18. After the pin 58 strikes the face 32a, continued counterclockwise rotation of the hand wheel 23 causes rotation of the member 30 and hence rotation of the pinion 18 in the brake release direction through the member 33, thereby causing rotation of the gear 11 and unwinding of the chain 16.

It will be apparent that the combination of both brake release mechanisms permits the achievement of the highly desirable and improved results which cannot be obtained with either mechanism alone. It will be seen that without the clutch mechanism the hand wheel 23 would spin on release of the brakes, and it would not be possible to release the brakes gradually, smoothly, and in small increments. On the other hand, without the quick release mechanism, while it would be possible to adjust the brakes to any desired position, it would not be possible to disengage them quickly and to eliminate the time and effort required for several turns of the hand wheel 23. Furthermore, the combination set forth requires fewer parts than the parts required for two separate mechanisms connected to the same chain 16, and the few parts of the combination cooperate to produce the results of two separate mechanisms.

Having thus described my invention with particular reference to the preferred form thereof and having described certain modifications, it will be obvious to those skilled in the art to which the invention pertains after understanding my invention that various changes and other modifications may be made therein without departing from the spirit and scope thereof as defined by the claims appended hereto.

What is claimed is:

1. A brake operating mechanism comprising a rotatable shaft, a driving member mounted on said shaft, means operable by said shaft for moving said driving member axially in two opposite directions upon relative rotation between said shaft and said driving member, a detent member adapted to be clamped to and unclamped from said driving member by such axial movement, a coupling member slidably mounted on said driving member and rotatable therewith, a pinion rotatably mounted on said shaft, means for urging said coupling member into engagement with said pinion whereby said pinion rotates with said driving member, and means for disengaging said pinion and said coupling member whereby said pinion rotates on said shaft independently of said coupling member and said driving member.

2. A brake operating mechanism comprising a rotatable shaft having a threaded portion, a threaded driving member rotatably mounted on said threaded portion of said shaft coaxial therewith and with the threads of said driving member engaged with the threads of said threaded portion for moving said driving member axially in two opposite directions on said shaft, a detent wheel mounted adjacent said driving member, a clutch disc mounted between said detent wheel and said driving member, a clutch member mounted adjacent said detent wheel on the side thereof remote from said driving member, said detent wheel being rotatable on said shaft, a coupling member slidably mounted on said driving member and rotatable therewith, a pinion rotatably mounted on said shaft adjacent said coupling member, means for urging said couping member into engagement with said pinion whereby said pinion rotates with said coupling member, and means for disengaging said pinion and said coupling member whereby said pinion rotates on said shaft independently of said coupling member and said driving member.

3. A brake operating mechanism comprising a rotatable shaft having a threaded portion, a threaded driving member rotatably mounted on said threaded portion of said shaft coaxial therewith and with the threads of said pinion engaged with the threads of said threaded portion for moving said driving member axially in two directions on said shaft, said driving member having a stop engaging portion spaced radially from and extending axially of the axis of said driving member, a stop member mounted on said shaft and rotatable therewith, said stop member being tangentially engageable with said stop engaging portion, a detent wheel mounted adjacent said driving member, a clutch disc mounted between said detent wheel and said driving member, a clutch member mounted adjacent said detent wheel on the side thereof remote from said driving member, said clutch member being rotatable with said shaft, a coupling member slidably mounted on said driving member and rotatable therewith, a pinion rotatably mounted on said shaft, means for urging said coupling member into engagement with said pinion whereby said pinion rotates with said coupling member, and means for disengaging said pinion and said coupling member whereby said pinion rotates on said shaft independently of said coupling member and said driving member.

4. A hand brake mechanism comprising a rotatable take-up drum and means for rotating said drum comprising: a manually rotatable shaft having a threaded portion, a threaded driving member rotatably mounted on said threaded portion of said shaft coaxial therewith and with the threads of said driving member engaged with the threads of said threaded portion for moving said driving member axially in two directions on said shaft, said driving member having a flange on one side thereof, a detent wheel mounted adjacent said driving member flange, a clutch disc mounted between said driving member flange and said detent member, a clutch member mounted on said shaft adjacent said detent wheel on the side thereof remote from said driving member flange, said clutch member being rotatable with said shaft, a coupling member slidably mounted on said driving member and rotatable therewith, said coupling member having a flange on the side thereof facing away from said detent wheel and said last mentioned flange having apertures therein, a pinion rotatably mounted on said shaft adjacent said last mentioned flange and drivingly connected to said drum, said pinion having axially extending projections thereon receivable in said apertures, a spring mounted between said driving member flange and said coupling member flange and urging said coupling member toward said pinion whereby said projections on said pinion enter said apertures, and means for moving said coupling member away from said pinion and thereby withdrawing said projections from said apertures.

5. A brake operating mechanism comprising a rotatable shaft, a driving member mounted on said shaft, means operable by said shaft for moving said driving member axially in two opposite directions upon relative rotation between said shaft and said driving member, a detent member adapted to be clamped to and unclamped from said driving member by such axial movement, a coupling member slidably mounted on said driving member and rotatable therewith, said coupling member having an apertured flange, a pinion rotatably mounted on said shaft, said pinion having axially extending projections formed integrally thereon for insertion into said apertures, means for urging said coupling member toward said pinion causing said projections to enter said apertures whereby said pinion rotates with said driving member and means for moving said coupling member from said pinion causing said projections to withdraw from said apertures whereby said pinion rotates on said shaft independently of said coupling member and said driving member.

References Cited by the Examiner
UNITED STATES PATENTS

| | | | |
|---|---|---|---|
| 1,911,954 | 5/33 | Haseltine | 74—505 |
| 2,229,827 | 1/41 | Van Cleave | 74—505 |
| 3,040,597 | 6/62 | Bretz | 74—505 |

BROUGHTON G. DURHAM, *Primary Examiner.*